United States Patent [19]

Ritz et al.

[11] Patent Number: 5,238,054
[45] Date of Patent: Aug. 24, 1993

[54] STEAM GENERATOR NOZZLE DAM

[75] Inventors: William C. Ritz, Greensburg; Robert D. Burack, Pleasant Hills, both of Pa.

[73] Assignee: Westinghouse Electric Corp., Pittsburgh, Pa.

[21] Appl. No.: 618,127

[22] Filed: Nov. 26, 1990

[51] Int. Cl.$^5$ .............................................. F16L 55/11
[52] U.S. Cl. ...................................... 165/71; 138/89; 376/204
[58] Field of Search .......................... 138/89; 165/71; 376/204

[56] References Cited

U.S. PATENT DOCUMENTS

| | | | |
|---|---|---|---|
| 4,436,692 | 3/1984 | Stenabaugh | 376/204 |
| 4,584,162 | 4/1986 | Yoli | 376/204 |
| 4,624,824 | 11/1986 | Dooley | 376/204 |
| 4,667,701 | 5/1987 | Evans et al. | 138/93 |
| 4,671,326 | 6/1987 | Wilhelm et al. | 138/93 |
| 4,672,741 | 6/1987 | Zafred et al. | 29/726 |
| 4,684,491 | 8/1987 | Rylatt | 376/203 |
| 4,690,172 | 9/1987 | Everett | 138/89 |
| 4,777,008 | 10/1988 | Shirasu | 376/204 |
| 4,954,312 | 9/1990 | McDonald et al. | 376/260 |
| 4,957,215 | 9/1990 | Evans et al. | 220/232 |
| 4,959,192 | 9/1990 | Trundle et al. | 376/260 |

Primary Examiner—Allen J. Flanigan

[57] ABSTRACT

A nozzle dam assembly for closing off a nozzle of a steam generator and a process for remotely positioning such nozzle dam are disclosed. The nozzle dam includes a mounting ring mounted on an inner surface of the steam generator about a periphery of an inner opening of the nozzle, at least one substantially planar central section and two substantially planar side sections together forming a substantially planar surface, the surface being of a greater diameter than the inner opening of the nozzle. Securing devices are also provided for securing each of the sections to the mounting ring after all the sections are positioned over the inner opening of the nozzle. Also provided is a sealing gasket which is secured to the central section with the sealing gasket having a diameter substantially equal to a diameter of the substantially planar surface formed by the sections for forming a fluid tight seal between a periphery of the substantially planar surface and the inner surface of the steam generator about the periphery of the inner opening of the nozzle. Each of the sections are initially passed through the manway of the steam generator. Once inside the channel head of the nuclear steam generator, the central section of the nozzle dam is retrieved by a robotic arm and positioned over a central portion of the nozzle opening. The robotic arm then positions the remaining side sections over the opening. Once each of the sections are aligned and positioned on the mounting ring, a bolt torque mechanism is then attached to the robotic arm and integral hold down bolts of the sections are sequentially tightened.

30 Claims, 4 Drawing Sheets

STEAM GENERATOR NOZZLE DAM

TECHNICAL FIELD OF THE INVENTION

The present invention relates to a steam generator nozzle dam for providing a fluid tight seal at the primary fluid nozzles of the nozzles of the nuclear steam generator, and more particularly to a multi-section nozzle dam which is remotely installed over an internal portion of the primary fluid nozzles within the channel head of the nuclear steam generator.

BACKGROUND OF THE INVENTION

A typical nuclear steam generator comprises a vertically oriented shell or vessel. A tube sheet adjacent the lower end of the vessel supports a tube bundle comprising a plurality of tubes, each generally in the shape of an inverted U. The portion of the vessel beneath the tube sheet is divided by a partition into inlet and outlet plenums which are respectively disposed immediately beneath the vertical legs of the tube bundle. The vessel is provided with primary fluid inlet and outlet nozzles, respectively communicating with the plenums, each nozzle projecting outwardly of the vessel and commonly having a frusto-conical portion and a cylindrical portion. The nozzles are connected by conduits to an associated nuclear reactor vessel.

Primary fluid having been heated by circulation through the reactor, enters the steam generator vessel through the primary inlet nozzle to the inlet plenum and from there flows upwardly through the tube bundle to the outlet plenum and then back through the outlet nozzle to the reactor core. The tube bundle above the tube sheet is immersed in a secondary fluid, such as water, the tube bundle serving as a heat exchanger for converting the secondary water to steam, which is then used for generating electricity in the usual manner.

Periodically, it is necessary to shut down the reactor for refueling. This is usually a convenient time for servicing the nuclear steam generator. In this regard, the reactor is drained to below the level of the inlet and outlet nozzles of the steam generator vessel. The tube bundle and inlet and outlet plena are also drained and dams are then installed in the inlet and outlet nozzles to block them. The steam generating vessel can then be treated in a chemical decontamination procedure without contaminating the primary fluid conduits and the nuclear reactor.

Additionally, during refueling operations in a nuclear generating plant, it is desirable to simultaneously perform maintenance procedures on the steam generator. To do this, the inlet nozzle of the steam generator vessel must be closed off. This is accomplished by use of a nozzle seal or dam which is installed in the nozzle from inside the inlet plenum of the generator vessel.

Heretofore, a number of different types of fixed or static nozzle dams have been utilized. Most of these dams involve permanent modification of the nozzle, either by drilling holes therein or the mounting of attachment structure thereon, these techniques entail significant man-rem exposure. It is also known to utilize expandable bags or diaphragms or the like which are inserted in the nozzle and expanded to plug the nozzle. But such prior expandable seals do not adhere particularly well to the nozzle inner surface.

One such nozzle seal is disclosed, for example, in U.S. Pat. No. 4,637,588 issued to Calhoon et al. and entitled "Non-Bolted Ringless Nozzle Dam". Since work must be done within the inlet plenum, the nozzle seal or dam must be fully secured about the nozzle. While the nozzle seal is provided with an anchor assembly for anchoring it in place in the nozzle; nevertheless, this may be insufficient to insure that the nozzle seal will not be dislodged or displaced as a result of large pressure buildups within the nozzle, which could result in the release of reactor coolant which would be extremely hazardous to service and maintenance personnel.

It has been suggested that retention of the nozzle seal be accomplished by a restraint beam which essentially operates like a bar or beam wedged between the nozzle seal and the environmental ledge of the generator vessel. However, such a beam arrangement is quite heavy and difficult to install, resulting in large exposure times. Its construction and manner of installation concentrates all the retaining force at a single location on the steam generator environmental ledge, creating à high risk area at that point. Furthermore, such a device does not readily accommodate manufacturing tolerances in the dimensions of the nozzle and the nozzle seal which result in variations in the seating location of the nozzle seal in the nozzle.

Another version of the Westinghouse nozzle dam incorporates two or more of the circular foldable seal assemblies, interconnected by a central tubular coupling, incorporating a quick-disconnect which is operable from outside the seal assemblies. The coupling is threadedly engaged with each of the two interconnected seal assemblies. While this arrangement operates well in most applications, any torque on either of the two seal assemblies tends to cause relative rotation of the seal assemblies, resulting in unscrewing of the coupling and attendant loosening of the seal. Such loosening may result in excessive leakage about the seal.

Furthermore, the seal assemblies of this arrangement could move as a result of pressure changes on opposite sides thereof, improper seating and the like and, as a result of such movement, the two seal assemblies may not stay parallel, which also would result in poor sealing and resultant leakage. This non-parallel condition could cause the center tubular coupling to be bent, which would interfere with the operation of the quick disconnect mechanism.

In an effort to overcome the aforementioned shortcomings, U.S. Pat. No. 4,671,326 issued to Wilhelm et al. discloses a dual seal nozzle dam with each of the seals comprising a circular three section folded seal plate covered with a flexible diaphragm and circumferentially encompassed by an inflatable seal which when in place frictionally engages the inner surface of the nozzle in order to maintain the nozzle dam in place therein. The dual seals are interconnected by a central tubular coupling. However, as set forth in this disclosure, the positioning and securing of the nozzle dam is carried out by operation personnel thereby exposing such personnel to unnecessary amounts of radioactivity. Moreover, once in place, the inflatable seals may be ruptured thereby causing insurmountable leakage or the complete dislodging of the nozzle dam from within the nozzle.

U.S. Pat. No. 4,684,491 issued to Rylatt and assigned to the assignee of the present application discloses yet another nozzle dam including a retaining assembly which holds the nozzle dam within the nozzle of the nuclear steam generator. Again, this device is positioned within the nozzle of the nuclear steam generator by maintenance personnel who are thus subjected to unnecessary amounts of radiation. Moreover, because the locking mechanism is inserted within a plurality of tubes within the tube sheet, those tubes already accommodated by the locking mechanism will be difficult to inspect and, consequently, may not be maintained in their optimal condition.

U.S. Pat. No. 4,667,701 issued to Evans et al. discloses a multi-section nozzle dam which is hingedly connected to the inner periphery of the inlet nozzle. A frame is secured to the inlet nozzle and the multiple nozzle dam segments are secured thereto. A sealing diaphragm is initially positioned over the uppermost segment and once each section has been secured to the frame, the diaphragm is drawn over the remaining segments. Again, however, as with the previous constructions, the nozzle dam of U.S. Pat. No. 4,667,701 must be manually secured within the plenum of the steam generator and consequently subjects maintenance personnel to significant radiation exposure. Moreover, the frame is continuously exposed to contaminants.

Clearly, there is a need for a simple, reliable nozzle dam for sealing off the nozzles of the channel head of a nuclear steam generator. Moreover, there is a need for a nozzle dam which may be both reliably and remotely installed, positioned and secured over the nozzle of the nuclear steam generator such that maintenance personnel are exposed to minimal amounts of radiation.

SUMMARY OF THE INVENTION

It is, therefore, a principal object of the present invention to overcome the shortcomings associated with the prior art devices discussed above.

Another object of the present invention is to provide a reliable seal between the channel head of a steam generator and the reactor so as to allow maintenance procedures to be carried out within the steam generator during refueling of the reactor.

It is yet another object of the present invention to provide a nozzle dam which is remotely positioned and secured over the inner opening of a nozzle within the steam generator so as to minimize the radiation exposure of maintenance personnel.

These as well as additional objects of the present invention are achieved by providing a nozzle dam assembly for closing off the inner opening of a nozzle of a steam generator and a process for remotely positioning such nozzle dam. The nozzle dam in accordance with the present invention includes a mounting ring mounted on an inner surface of the steam generator about a periphery of the inner opening of the nozzle, at least one substantially planar central section and two substantially planar side sections together forming a substantially planar surface, the surface being of a greater diameter than the inner opening of the nozzle. Securing devices are also provided about the periphery of each of the sections for securing each of the sections to the mounting ring after all the sections are positioned over the inner opening of the nozzle. Also provided is a sealing gasket which is secured to the central section with the sealing gasket having a diameter substantially equal to the diameter of the substantially planar surface formed by the sections for forming a fluid tight seal between a periphery of the substantially planar surface and the inner surface of the steam generator about the periphery of the inner opening of the nozzle.

Each of the sections are initially passed through the manway of the steam generator. Once inside the channel head of the nuclear steam generator, the central section of the nozzle dam is retrieved by a robotic arm and positioned over a central portion of the nozzle opening. The robotic arm then positions the remaining side sections over the opening. Once each of the sections are aligned and positioned on the mounting ring, a bolt torque mechanism is then attached to the robotic arm and integral hold down bolts of the sections are sequentially tightened.

These as well as additional advantages of the present invention will become apparent from the following detailed description of the preferred embodiment with reference to the several figures.

DETAILED DESCRIPTION OF THE PREFERRED EMBODIMENT

Figure 1:
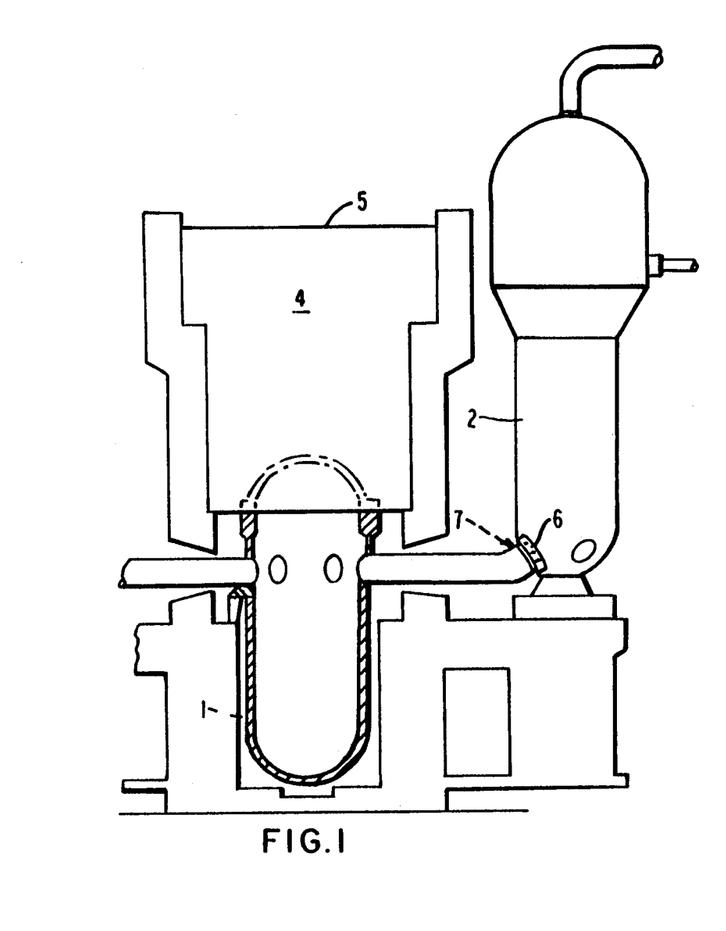
FIG. 1 is an elevational view of a typical nuclear reactor and steam generator showing the nozzle dam location.

Referring now to FIG. 1, a typical pressurized water reactor 1 is illustrated which is connected to a typical nuclear steam generator 2 by way of a conduit 3. During the previously mentioned plant shutdowns, the refueling pool 4 is flooded, for purposes of refueling, with water to a level 5 which is significantly above the position of the inlet nozzle 6 of the nuclear steam generator, and; consequently, a nozzle dam 7 must be securely positioned over the inlet nozzle 6 in order to reliably isolate the nuclear steam generator 2 from the pressurized water reactor 1. The placement of the nozzle dam 7 within the nuclear steam generator 2 must be carried out prior to the flooding of the refueling pool 4.

Figure 2:
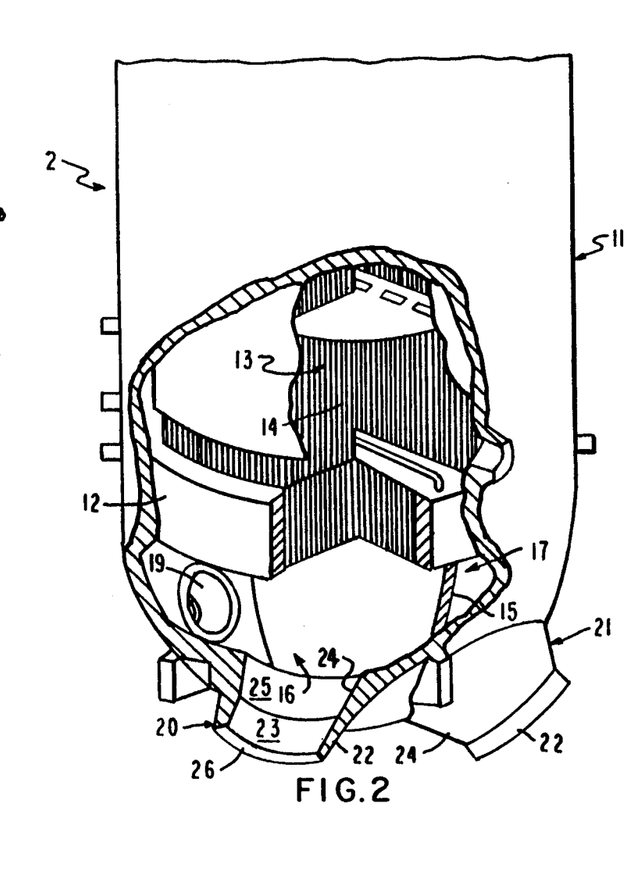
FIG. 2 is a fragmentary perspective view of the lower end of the nuclear steam generator vessel, with portions broken away so as to more clearly illustrate the inlet and outlet nozzles to which the present invention is readily adapted.
Figure 5:
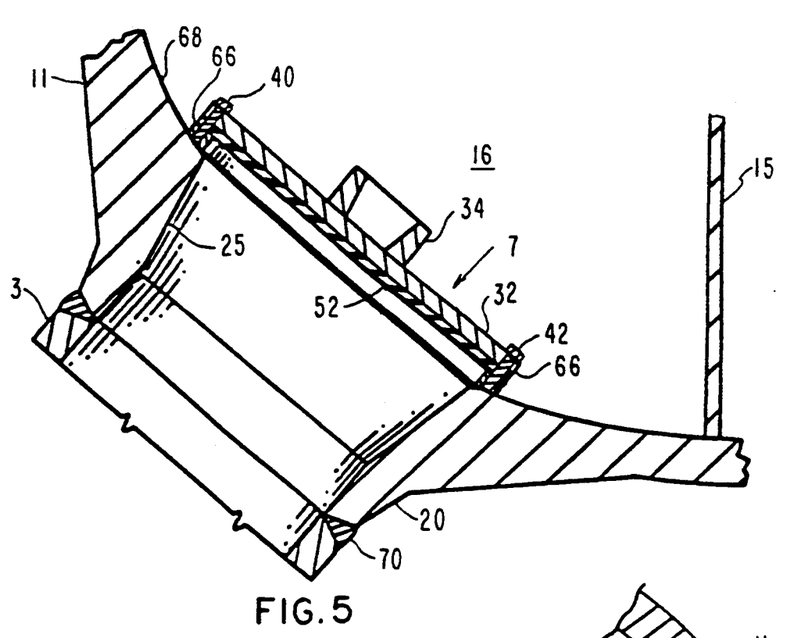
FIG. 5 is a cross-sectional view of the nozzle dam in accordance with the present invention positioned over a nozzle of a nuclear steam generator.

Referring now to FIG. 2, there is illustrated a portion of the nuclear steam generator 2 which includes a vessel 11 having a generally partial spherical lower end which is separated from the upper end thereof by a horizontally disposed tubesheet 12. Mounted on the tubesheet 12 is a tube bundle 13 including a plurality of generally inverted U-shaped tubes 14 having the lower ends thereof disposed through complimentary bores in the tubesheet 12. The portion of the vessel 11 below the tubesheet 12 is divided by a wall 15 into an inlet plenum 16 and an outlet plenum 17, which respectively communicate with the two vertical portions of the tubes 14. Formed in the vessel 11 are manways (one shown) which provide access to the inlet and outlet plenum 16 and 17. Also respectively communicating with the inlet and outlet plenum 16 and 17 and projecting outwardly from the vessel 11 are two nozzles 20 and 21 each having an outer cylindrical portion 22 having a cylindrical inner surface 23 and an inner frusto-conical portion 24 having a frusto-conical inner surface 25. The outer end of each of the nozzles 20 and 21 defines an annular wall 26 which is adapted to be secured as by a suitable weldment 70 to the associated conduit 3 as illustrated in FIG. 5, which extends to the pressurized water reactor 1 as illustrated in FIG. 1.

In general, there are presently two types of nozzles which may be exist in existing steam generator vessels. One type has a relatively long cylindrical portion 22 and a relatively short frusto-conical portion 24, this type being exemplified by the nozzle 20, while another type has a relatively short cylindrical portion 22 and a relatively long frusto-conical portion 24. This type being exemplified by nozzle 21. With the typical nuclear steam generator, the vessel 11 will include nozzles of the same type; however, both types have been illustrated in FIG. 2 for the purposes of illustration. Moreover, the nozzle dam of the present invention may be readily adapted to either type of nozzle.

Figure 3A:
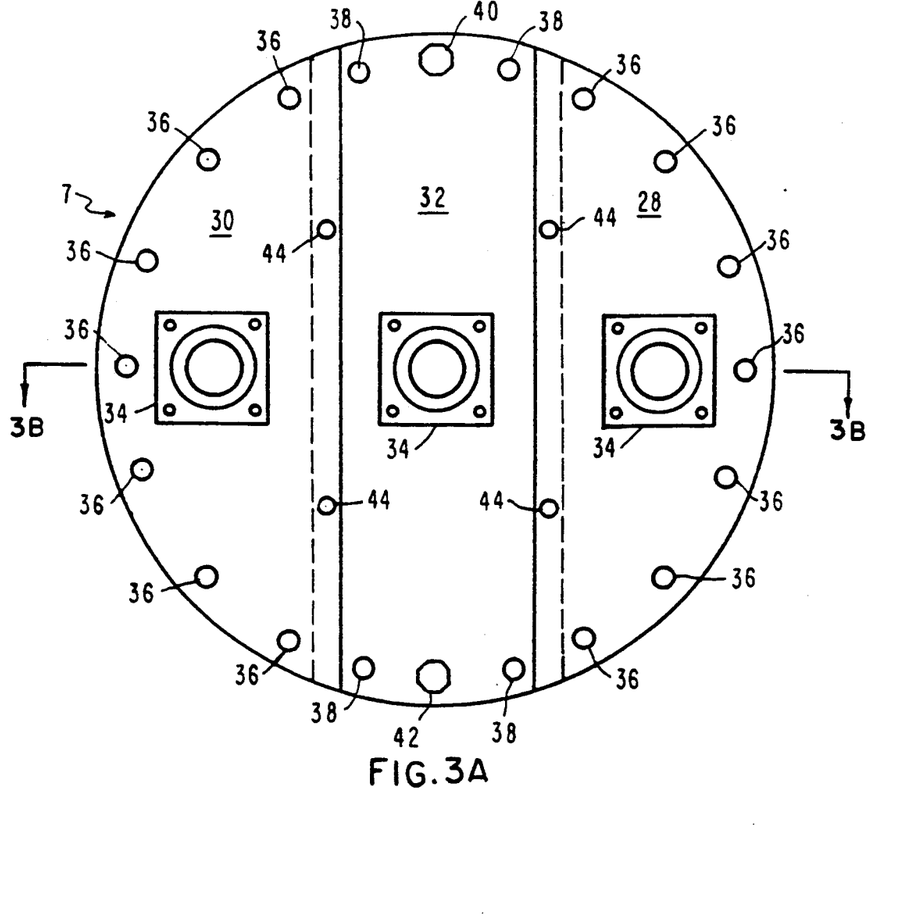
FIG. 3A is a plan view of the three-piece nozzle dam in accordance with the present invention.

Turning now to FIG. 3, the nozzle dam 7 in accordance with the present invention will be discussed in greater detail. As can be seen from FIG. 3, the nozzle dam of the present invention consists of three sections, each being a segment of a circular disk, a right section 28, a left section 30 and a central section 32. Each of the sections 28–32 include a centrally located adapter 34, the significance of which will be discussed in greater detail hereinbelow, allows each of the sections to be remotely manipulated by a remote control mechanical arm 56, such as the ROSA III mechanical arm developed by the assignee of the present invention and described in greater detail in copending U.S. patent application Ser. No. 07/607705. The dam sections are manufactured of 1 - weight composite material such as carbon filament epoxy, kevlar epoxy, or aluminum honeycomb. The design requirements are such that each individual piece be less than 35 pounds so as to facilitate the handling of the sections by the robotic arm, as well as maintenance personnel outside the generator. Further, once in place within the nuclear steam generator, the dam assembly must be capable of withstanding 35 psi of water pressure. In accordance with a preferred embodiment of the present invention, each section has a thickness of approximately two inches, and an overall diameter of 41½ inches.

Figure 3B:
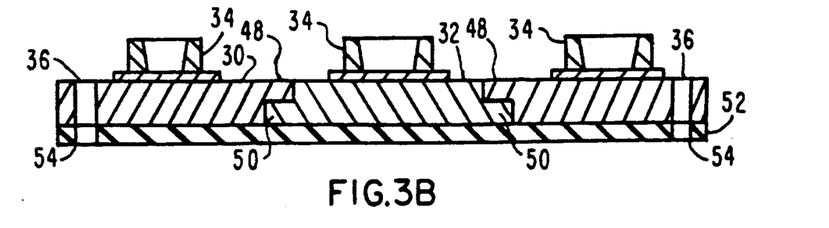
FIG. 3B is a cross-sectional view of the nozzle dam of FIG. 3A taken along line B—B.
Figure 3C:
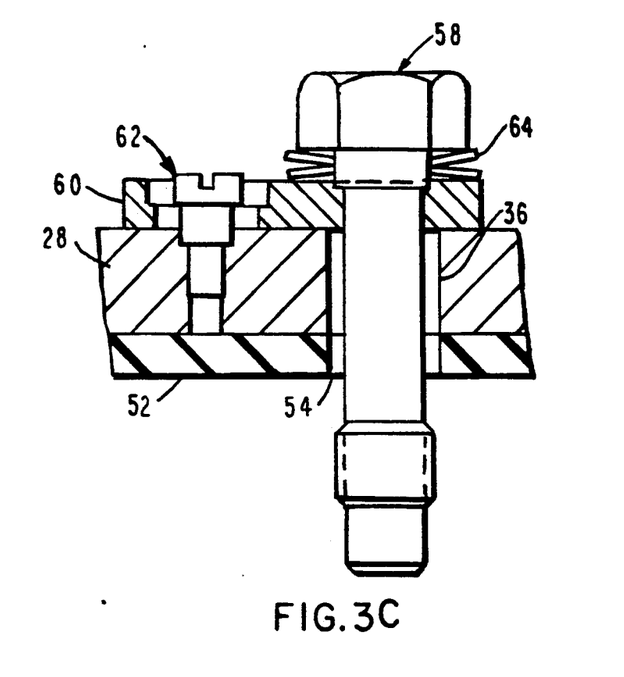
FIG. 3C is an expanded view of an integral hold down bolt in accordance with the present invention.

Each of the nozzle dam sections 28 and 30 include seven bores 36 mutually spaced about the periphery of the outer sections which accommodate integral hold down bolts 58 illustrated in FIG. 3C, for remotely securing the outer plates 28, 30 to a pre-installed ring 66 mounted above the nozzle inside the steam generator. The central section 32 includes bores 38 about its periphery which likewise accommodate integral hold down bolts for securing the central section to the pre-installed ring. Because the nozzle dam, when installed within the steam generator, rests on an inclined surface, and because centering of the dam bolts over their mating tapered holes is difficult, a guide pin is incorporated into the central topmost bolt 40 and the central lowermost bolt 42 to aid in centering the dam on the pre-installed bolting ring. Also included in each of the outer sections 28 and 30 are guide bores 44 which receive guide pins 46 (illustrated in FIG. 4) in order to align each of the outer sections 28 and 30 with the central section 32 upon placement over the nozzle within the nuclear steam generator.

Referring now to FIG. 3B, it can be noted that each of the outer sections 28 and 30 include step sections 48 which overlie the step sections 50 of the central section 32 when the nozzle dam 7 is in its final applied state. Also it should be noted that a gasket 52 is positioned to underlie the entire bottom surface of the nozzle dam 7 and includes cooperating bores 54 which mate with the bores 36 and 38 of each of the nozzle dam sections in order to allow the passage of the integral hold down bolts.

FIG. 3C is an expanded illustration of one of the integral hold down bolts referred to above, mounted on the side section 28. The integral hold down bolt 58 extends through the bore 36 formed in the side section as well as the bore 54 formed in the gasket 52. The hold down bolt 58 is retained in place by a capture plate 60 which is secured to the upper surface of the side section 28 by fastening means 62. The hold down bolt 58 is biased by way of a spring washer 64 which allows a torque tool to press and rotate the integral hold down bolt once the bolts have been aligned with respective bores of the pre-installed ring mounted within the nuclear steam generator.

Figure 4:
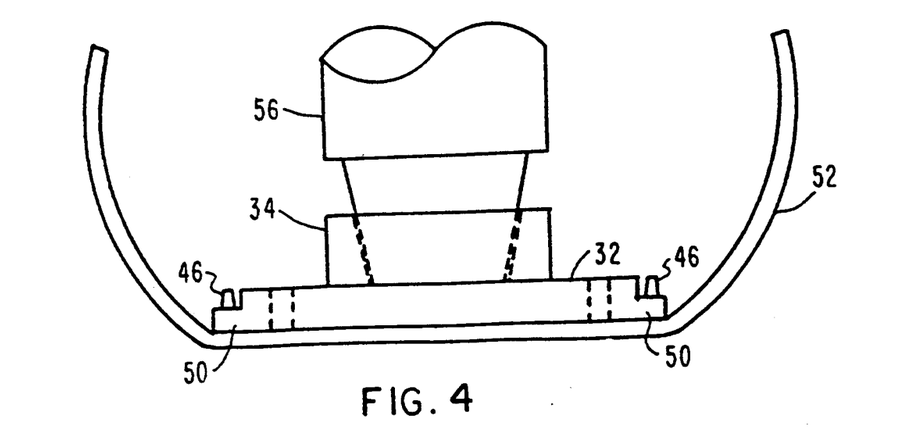
FIG. 4 is an elevational view illustrating the central section of the nozzle dam having a gasket secured thereto and being manipulated by a robotic positioning mechanism in accordance with the present invention.

Turning now to FIG. 4, the central section 32 is illustrated in its initial condition wherein the robotic arm 56 is coupled by way of the adapter 34 to the central section 32 in order to manipulate the central section 32 within the nuclear steam generator. The joint between the central section 32 of the nozzle dam 7 and the robotic arm 56 which is used to lift the dam sections into place is preferably an electromagnetic connection. However, other devices such as mechanical, pneumatic or vacuum joints may be readily adapted to form the connection between the robotic arm 56 and the central section 32 in order to manipulate the sections within the nuclear steam generator. It is also to be noted that the full diameter sealing gasket 52 is attached to and is an integral part of the central section 32 of the nozzle dam 7. As will be set forth in greater detail hereinbelow, the central section 32 of the nozzle dam 7 is the first section to be positioned over the pre-installed ring. The two outer sections 28 and 30 which mechanically overlap the central section 28 are subsequently installed. It should also be noted that because the outer sections include a significant arcuate outer periphery, they are more rigid than the central section and; consequently, the step connection between the outer sections 28 and 30 and the central section 32 adds to the rigidity of the central section and the ability of the entire nozzle dam 7 to withstand a significant pressure while being of a light weight.

As is illustrated in FIG. 5, the sections of the nozzle dam are secured to the pre-installed ring 66 which is secured to the inner surface 68 of the nuclear steam generator. FIG. 5 illustrates the nozzle dam being positioned over the nozzle which extends from the plenum 16 of the nuclear steam generator, such a nozzle dam may be readily positioned over the nozzle 21 which communicates with the plenum 17. The nozzle dam 7 is secured such that it spans the entire opening of the nozzle and thereby reliably seals off the nozzle 20 and prohibits the ingress or egress of fluid therethrough. As can be further seen from FIG. 5, the nozzle 20 is secured to the conduit 3 by way of the weldment 70.

Figure 6:
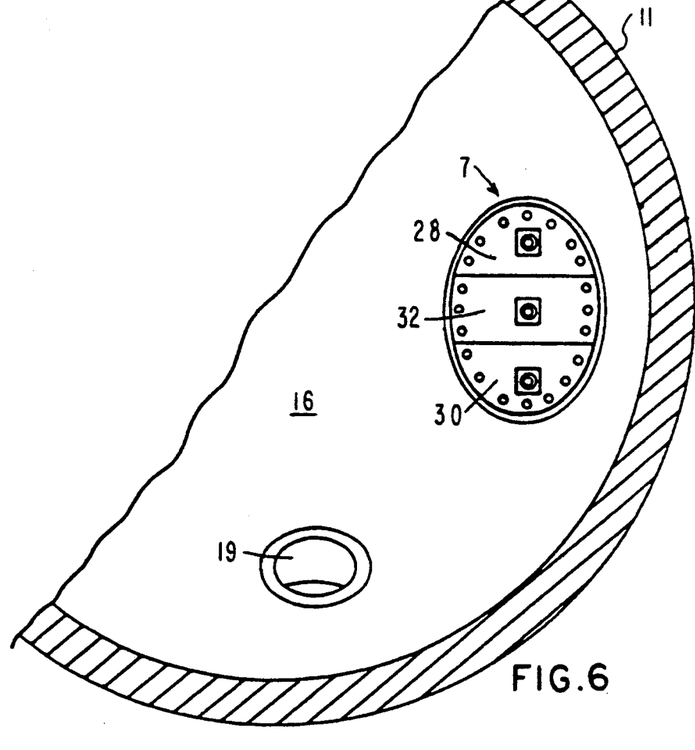
FIG. 6 is a plan view of the nozzle dam in position over the nozzle of the nuclear steam generator.

FIG. 6 illustrates the nozzle dam 7 in its completely erect condition covering the nozzle which extends from the plenum 16 of the nuclear steam generator. Also illustrated in this Figure is the manhole 19 which provides access to the plenum 16.

Installation of the above-described nozzle dam will now be set forth in greater detail. The nozzle dam as mentioned above is divided into three approximately equal sections which are sized to pass through the manway of the steam generator. Once inside the channel head of the nuclear steam generator, the central section 32 of the nozzle dam 7 is retrieved by the robotic arm 56 and positioned over a central portion of the nozzle. As is described above, the full diameter sealing gasket 52 is attached to and is an integral part of the central dam section and, consequently, covers the entire nozzle once the central nozzle dam section 32 is in place. The robotic arm 56 aligns the upper central alignment pin and lower central alignment pin of the central section 32 with the pre-installed ring 66 thus ensuring the proper installation of the central section. Once in place, the robotic arm 56 releases the central section and retrieves one of the side sections 28, 30. This section is then placed in its proper position over the gasket material and is aligned with the central section 32 by mating the mating pins 46 of the central section 32 with the respective bore 44 of the side section. Once in position, the robotic arm releases this section and subsequently retrieves the final side section and places this section alongside the central section 32 as with the previous side section. Once each of the sections are aligned and positioned on the pre-installed ring 66, a bolt torque mechanism is attached to the robotic arm and the integral hold down bolts of the central section and side sections are sequentially tightened. Once tightened, the refueling pool 4 may be flooded while maintenance procedures are carried out within the steam generator.

Once the maintenance procedures have been carried out within the nuclear steam generator, the nozzle dam may be readily removed. The removal of the nozzle dam is carried out in the reverse order of its installation described above.

As can be seen from the foregoing, the nozzle dam 7 in accordance with the present invention may be remotely installed thereby eliminating the manned entry required for the installation of present nozzle dams and thus minimizes the exposure of maintenance personnel to radiation. Moreover, the nozzle dam in accordance with the present invention will reliably and securely seal-off the nozzle to assure a secure environment within the steam generator for carrying out various maintenance procedures.

While the present invention has been described with reference to a preferred embodiment, it will be appreciated by those skilled in the art that the invention may be practiced otherwise than as specifically described herein without departing from the spirit and scope of the invention. It is, therefore, to be understood that the spirit and scope of the invention be limited only by the appended claims.

What is claimed is:

1. A nozzle dam assembly for closing off a nozzle of a steam generator, comprising:
    a mounting ring mountable on the inner surface of the steam generator about the periphery of the inner opening of the nozzle;
    at least two substantially planar sections together forming a substantially planar surface, said surface being of a greater diameter than an inner opening of the nozzle;
    securing means for individually securing each of said sections to said mounting ring to allow the entire planar surface formed by said sections to be assembled directly over said nozzle opening;
    a sealing means positioned between said sections and said mounting ring for forming a fluid tight seal about the inner nozzle opening, and
    an alignment and positioning means for sequentially and individually aligning said planar sections over said mounting ring and maintaining said sections in said aligned position prior to the securing of said sections by said securing means.

2. The nozzle dam as defined in claim 1, further comprising an adapter means for detachably coupling with a remotely operable manipulation means that remotely moves each of said sections over said mounting ring, wherein at least one adapter means is fixedly secured to each of said sections.

3. The nozzle dam as defined in claim 2, wherein said adapter means is secured to an upper surface of said section.

4. The nozzle dam as defined in claim 1, wherein said sealing means is secured to a lower surface of a first section to be positioned on said mounting ring.

5. The nozzle dam as defined in claim 1, wherein said sealing means is a sealing gasket.

6. The nozzle dam as defined in claim 5, wherein said nozzle dam includes a central section and two side sections, with said sealing gasket being secured to said central section.

7. The nozzle dam as defined in claim 6, wherein said central section includes at least one first alignment means for aligning said central section on said mounting ring.

8. The nozzle dam as defined in claim 7, wherein said central section includes two arcuate edges corresponding substantially to the outside diameter of said mounting ring and two substantially parallel edges extending between said arcuate edges and stepped portions extending along each of said substantially parallel edges.

9. The nozzle dam as defined in claim 8, wherein each of said side sections includes an arcuate edge corresponding substantially to the outside diameter of said mounting ring and a substantially straight edge extending from a first end of said arcuate edge to a second end of said arcuate edge, said straight edge including a stepped portion complimentary to said one of said stepped portions of said central section such that, each of said side sections overlap a respective parallel edge of said central section.

10. The nozzle dam as defined in claim 9, wherein said stepped portions of said central section each include at least one section alignment means and each of said stepped portions of said side sections includes at least one cooperating alignment means for cooperating with a respective one of said second alignment means of said central section to align said side sections with respect to said central section.

11. The nozzle dam as defined in claim 1, wherein said alignment and positioning means includes guide pins for each of said planar sections.

12. The nozzle dam as defined in claim 1, wherein said planar surface is comprised of a central planar section flanked by two side planar sections, and wherein said alignment and positioning means includes at least one guide pin mounted on said central section that is receivable within a bore in said mounting ring.

13. The nozzle dam as defined in claim 12, wherein said alignment and positioning means further includes at least second and third guide pins for properly aligning and positioning said side sections with respect both to said central section and said mounting ring.

14. The nozzle dam as defined in claim 13, wherein said second and third guide pins are mounted on opposing edges of said central section, and are receivable within bores present in said side sections.

15. A nozzle dam assembly for closing off a nozzle of a steam generator, comprising:
- a mounting ring mounted on an inner surface of the steam generator about a periphery of an inner opening of the nozzle;
- at least two substantially planar sections together forming a substantially planar surface, said surface being of a greater diameter than an inner opening of the nozzle;
- alignment and positioning means for sequentially and individually aligning said planar sections over said mounting ring;
- securing means for individually and sequentially securing each of said sections to said mounting ring to allow the entire planar surface formed by said sections to be assembled directly over said nozzle opening; and
- a sealing means positioned between said sections and said mounting ring for forming a fluid tight seal about the inner nozzle opening after all of said sections have been assembled over said nozzle opening.

16. The nozzle dam as defined in claim 15 further comprising an adapter means for detachably coupling with a remote manipulation means for remotely moving each of said sections into said alignment position.

17. The nozzle dam as defined in claim 16, wherein at least one adapter means is fixedly secured to each of said sections.

18. The nozzle dam as defined in claim 17, wherein said adapter means is secured to an upper surface of said section.

19. The nozzle dam as defined in claim 18, wherein said sealing means is secured to a lower surface of a first section to be positioned on said mounting ring.

20. The nozzle dam as defined in claim 19, wherein said sealing means is a sealing gasket.

21. The nozzle dam as defined in claim 20, wherein said nozzle dam includes a central section and two side sections, with said sealing gasket being secured to said central section.

22. The nozzle dam as defined in claim 21, wherein said central section includes at least one first alignment means for aligning said central section on said mounting ring.

23. The nozzle dam as defined in claim 22, said central section includes two arcuate edges corresponding substantially to the outside diameter of said mounting ring and two substantially parallel edges extending between said arcuate edges and stepped portions extending along each of said substantially parallel edges.

24. The nozzle dam as defined in claim 23, wherein each of said side sections includes an arcuate edge corresponding substantially to the outside diameter of said mounting ring and a substantially straight edge extending from a first end of said arcuate edge to a second end of said arcuate edge, said straight edge including a stepped portion complimentary to said one of said stepped portions of said central section such that each of said side sections overlap a respective parallel edge of said central section.

25. The nozzle dam as defined in claim 24, wherein said stepped portions of said central section each include at least one second alignment means and each of said stepped portions of said side sections includes at least one cooperating alignment means for cooperating with a respective one of said second alignment means of said central section to align said side sections with respect to said central section.

26. A nozzle dam assembly for closing off a nozzle of a steam generator having a mounting ring mounted on an inner surface of the steam generator about a periphery of an inner opening of the nozzle, said nozzle dam comprising:
- at least one substantially planar central section and two substantially planar side sections together forming a substantially planar surface, said surface being of a greater diameter than the diameter opening of the nozzle;
- alignment and positioning means for sequentially and individually aligning said planar sections over said mounting ring;
- securing means for securing each of said sections to said mounting ring after said sections have been aligned and positioned;
- a sealing gasket secured to said central section, said sealing gasket having a diameter substantially equal to a diameter of said substantially planar surface formed by said sections for forming a fluid tight seal between a periphery of said substantially planar surface and the inner surface of the steam generator, about a periphery of the inner opening of the nozzle, and
- an adapter means for detachably coupling with a remote manipulation means that remotely moves each of said sections into an aligned position on said mounting ring, wherein at least one adapter means is fixedly secured an upper surface of each of said sections, and wherein said alignment and positioning means maintains each of said sections in said aligned position after said sections are detached from said remote manipulation means by their respective adapter means.

27. The nozzle dam as defined in claim 26, wherein said central section includes at least one first alignment means for aligning said central section on said mounting ring.

28. The nozzle dam as defined in claim 26, wherein said central section includes two arcuate edges corresponding substantially to the outside diameter of said mounting ring and two substantially parallel edges extending between said arcuate edges and stepped portions extending along each of said substantially parallel edges, and each of said side sections includes an arcuate edge corresponding substantially to the outside diameter of said mounting ring and a substantially straight edge extending from a first end of said arcuate edge to a second end of said arcuate edge, said straight edge including a stepped portion complimentary to one of said stepped portions of said central section such that each of said side sections overlap a respective parallel edge of said central section.

29. The nozzle dam as defined in claim 28, wherein said stepped portions of said central section each include at least one second alignment means and each of said stepped portions of said side sections includes at least one cooperating alignment means for cooperating with a respective one of said second alignment means of said central section to align said side sections with respect to said central section.

30. A nozzle dam assembly for closing off a nozzle of a steam generator comprising:

a mounting ring mountable on the inner surface of the steam generator about the periphery of the inner opening of the nozzle;

a central planar section and two side planar sections together forming a substantially planar surface, said surface being of a greater diameter than an inner opening of the nozzle;

securing means for individually securing each of said sections to said mounting ring to allow the entire planar surface formed by said sections to be assembled directly over said nozzle opening; and a sealing means including a gasket positioned between said sections and said mounting ring for forming a fluid tight seal about the inner nozzle opening, wherein said central section includes two arcuate edges corresponding substantially to the outside diameter of said mounting ring and two substantially parallel edges extending between said arcuate edges and stepped portions extending along each of said substantially parallel edges, and wherein each of said side sections includes an arcuate edge corresponding substantially to the outside diameter of said mounting ring and a substantially straight edge extending from a first end of said arcuate edge to a second end of said arcuate edge, said straight edge including a stepped portion complimentary to said one of said stepped portions of said central section such that each of said side sections overlap a respective parallel edge of said central section, and wherein said stepped portions of said central section each include at least one second alignment means and each of said stepped portions of said side sections includes at least one cooperating alignment means for cooperating with a respective one of said second alignment means of said central section to align said side sections with respect to said central section.

* * * * *